(12) United States Patent
Hamabe et al.

(10) Patent No.: US 9,724,726 B2
(45) Date of Patent: Aug. 8, 2017

(54) COATING FILM PRODUCTION APPARATUS AND COATING FILM PRODUCTION METHOD USING THE SAME

(71) Applicant: Panasonic Intellectual Property Management Co., Ltd., Osaka (JP)

(72) Inventors: Masashi Hamabe, Osaka (JP); Takao Kuromiya, Osaka (JP); Masateru Mikami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/746,295

(22) Filed: Jun. 22, 2015

(65) Prior Publication Data

US 2016/0052010 A1    Feb. 25, 2016

(30) Foreign Application Priority Data

Aug. 25, 2014  (JP) ................................ 2014-169981
Apr. 22, 2015  (JP) ................................ 2015-087170

(51) Int. Cl.
*B05C 1/08*    (2006.01)
*B05D 1/28*    (2006.01)
(Continued)

(52) U.S. Cl.
CPC .............. *B05D 1/28* (2013.01); *B05C 1/0808* (2013.01); *B05D 1/18* (2013.01); *H01M 4/0404* (2013.01); *H01M 4/0409* (2013.01); *B05C 1/083* (2013.01); *B05C 1/0834* (2013.01); *B05C 1/0869* (2013.01); *B05C 1/14* (2013.01); *B05C 9/04* (2013.01);
(Continued)

(58) Field of Classification Search
CPC ..... B05C 1/0808; B05C 1/083; B05C 1/0834; B05C 9/04; B05C 19/00; B05C 1/0865; B05C 1/0869; B05C 1/14; B05D 1/28; B05D 1/18; H01M 4/0404; H01M 4/0409; H01M 4/139; H01M 4/0435;
(Continued)

(56) References Cited

U.S. PATENT DOCUMENTS 4,100,326 A  *  7/1978  Somezawa ............... G11B 5/84
                                                         427/128
4,537,127 A  *  8/1985  Fadner ..................... B41N 7/06
                                                         101/141
(Continued)

FOREIGN PATENT DOCUMENTS

JP       63-252570       10/1988
JP       2001-230158      8/2001
(Continued)

*Primary Examiner* — Laura Edwards
(74) *Attorney, Agent, or Firm* — Panasonic IP Management; Kerry S. Culpepper

(57) ABSTRACT

A high-quality coating film with a uniform thickness is produced without crush of coating particles even in a case where a wet coating material that does not require a step of drying the coating material is used, while maintaining high productivity. By providing a surface layer with an optimized hardness on the surface of a roll used for supply of a mixture coating material, a high-quality coating film with a uniform thickness can be produced, even in a case where a wet coating material that does not require a step of drying the coating material is used, while maintaining high productivity.

1 Claim, 10 Drawing Sheets

(51) Int. Cl.
  *B05D 1/18* (2006.01)
  *H01M 4/04* (2006.01)
  *B05C 1/14* (2006.01)
  *B05C 9/04* (2006.01)
  *B05C 19/00* (2006.01)
  *H01M 4/139* (2010.01)

(52) U.S. Cl.
  CPC ............. *B05C 19/00* (2013.01); *H01M 4/139* (2013.01); *Y02P 70/54* (2015.11)

(58) Field of Classification Search
  CPC .. H01M 4/0433; H01M 4/04; H01M 10/0565; Y02E 60/122; Y02E 60/12
  USPC ....... 118/221, 224, 244, 249, 259, 261, 262; 29/623.5, 623.3, 232, 217; 252/182.1; 429/209, 235; 264/104
  See application file for complete search history.

(56) References Cited

U.S. PATENT DOCUMENTS

| | | | |
|---|---|---|---|
| 6,758,903 B2* | 7/2004 | Levendusky | B05D 1/265 |
| | | | 118/227 |
| 8,119,289 B2 | 2/2012 | Fukumine et al. | |
| 2002/0119255 A1* | 8/2002 | Divigalpitiya | B05B 5/057 |
| | | | 427/8 |
| 2013/0085218 A1* | 4/2013 | Tian | C09D 4/00 |
| | | | 524/399 |

FOREIGN PATENT DOCUMENTS

| | | |
|---|---|---|
| JP | 4840358 B | 12/2011 |
| JP | 2014-139888 | 7/2014 |

\* cited by examiner

FIG. 16

| ITEM | COATING MATERIAL | | | | | SURFACE LAYER OF ROLL | | | | CORE | | RESULT | | |
|---|---|---|---|---|---|---|---|---|---|---|---|---|---|---|
| | TYPE | SINGLE PARTICLE CRUSH PRESSURE | GRANULE COLLAPSE PRESSURE | VOLUME SOLVENT RATE | MATERIAL | MATERIAL | YOUNG'S MODULUS | WATER CONTACT ANGLE | PENETRATION DEPTH OF PARTICLE | SURFACE ROUGHNESS | VOID | COATING FILM TRANSFERABILITY | CRUSH PROPERTY OF PARTICLE | REDUCTION OF FILM THICKNESS |
| EXAMPLE 1 | A: FOR ANODE | 0.3GPa | 0.02GPa | 50 | FLUORORESIN | | 0.65GPa | 120° | 50% | ROUGH SURFACE | PRESENT | SUPERIOR | SUPERIOR | SUPERIOR |
| EXAMPLE 2 | B: FOR CATHODE | 50GPa | 0.02GPa | 45 | DLC | | 300GPa | 115° | 5% | ROUGH SURFACE | PRESENT | SUPERIOR | SUPERIOR | SUPERIOR |

FIG. 17

| ITEM | COATING MATERIAL | | | | SURFACE LAYER OF ROLL | | | | CORE | | RESULT | | |
|---|---|---|---|---|---|---|---|---|---|---|---|---|---|
| | TYPE | SINGLE PARTICLE CRUSH PRESSURE | GRANULE COLLAPSE PRESSURE | VOLUME SOLVENT RATE | MATERIAL | YOUNG'S MODULUS | WATER CONTACT ANGLE | PENETRATION DEPTH OF PARTICLE | SURFACE ROUGHNESS | VOID | COATING FILM TRANSFERABILITY | CRUSH PROPERTY OF PARTICLE | REDUCTION OF FILM THICKNESS |
| COMPARATIVE EXAMPLE 1 | A: FOR ANODE | 0.3GPa | 0.02GPa | 50 | DLC | 300GPa | 115° | 3% | ROUGH SURFACE | PRESENT | SUPERIOR | INFERIOR | SUPERIOR |
| COMPARATIVE EXAMPLE 2 | A: FOR ANODE | 0.3GPa | 0.02GPa | 50 | SILICON RUBBER | 0.003GPa | 115° | 55% | ROUGH SURFACE | PRESENT | SUPERIOR | SUPERIOR | FAIR |
| COMPARATIVE EXAMPLE 3 | B: FOR CATHODE | 50GPa | 0.02GPa | 45 | FLUORORESIN | 0.65GPa | 120° | 60% | ROUGH SURFACE | PRESENT | SUPERIOR | SUPERIOR | FAIR |
| COMPARATIVE EXAMPLE 4 | B: FOR CATHODE | 50GPa | 0.02GPa | 45 | SILICON RUBBER | 0.003GPa | 115° | 100% | ROUGH SURFACE | PRESENT | SUPERIOR | SUPERIOR | INFERIOR |
| COMPARATIVE EXAMPLE 5 | A: FOR ANODE | 0.3GPa | 0.02GPa | 15 | FLUORORESIN | 0.65GPa | 120° | 40% | MIRROR SURFACE | ALMOST NONE | SUPERIOR | FAIR | SUPERIOR |
| COMPARATIVE EXAMPLE 6 | A: FOR ANODE | 0.3GPa | 0.02GPa | 15 | FLUORORESIN | 0.65GPa | 120° | 40% | ROUGH SURFACE | PRESENT | INFERIOR | — | — |
| COMPARATIVE EXAMPLE 7 | A: FOR ANODE | 0.3GPa | 0.02GPa | 70 | FLUORORESIN | 0.65GPa | 120° | 40% | ROUGH SURFACE | PRESENT | INFERIOR | — | — |
| COMPARATIVE EXAMPLE 8 | A: FOR ANODE | 0.3GPa | 0.02GPa | 50 | ACRYLIC RESIN | 0.7GPa | 70° | 30% | ROUGH SURFACE | PRESENT | INFERIOR | — | — |

COATING FILM PRODUCTION APPARATUS AND COATING FILM PRODUCTION METHOD USING THE SAME

TECHNICAL FIELD

The technical field relates to a production apparatus that produces a coating film by transferring a coating film material onto a coating object, and a coating film production method using the same.

BACKGROUND

Demand for electrochemical elements, such as small-sized, lightweight, lithium ion batteries with high energy density that are free of memory effects and tolerable to repetitive charging/discharging, or electric double layer capacitors with excellent charge/discharge cycle life, has rapidly expanded, in order to take advantage of their qualities. Since lithium ion rechargeable batteries have a relatively large energy density, and are small-sized and lightweight, they have been utilized in the fields of cell phones, notebook personal computers, etc. Also, since electric double layer capacitors are tolerable to rapid charging/discharging, and have excellent charge/discharge cycle life, they have been utilized as memory backup small-sized power supplies for PCs, etc. Furthermore, applications of these electrochemical elements as large power supplies for electric automobiles and electric storage facilities have been expected. As described above, with recent achievements of multifunction concerning purposes such as for electronic equipment, communication equipment or automobiles, the electrochemical elements have been expected to achieve further improvements of properties, such as even higher output, higher capacity, or improvements of mechanical properties. In such a situation, various improvements have been made in methods for forming an electrode for electrochemical elements, in order to improve performance of electrochemical elements.

For example, an electrode for electrochemical elements can be obtained in the following manner: as a coating film material, an electrode material containing an electrode active material and the like is formed into a sheet, and then, the sheet (electrode composition layer) is press-bonded to a collector that is a coating object, thereby obtaining an electrode. In order to allow an electrode for electrochemical elements to have higher capacity, it was required that the electrode active material be formed so as to have a high density.

In order to obtain such a high-density sheet-shaped molded product, JP-A-2001-230158 describes a method in which a material including carbon fines, a conductive assistant and a binder is mixed and kneaded to produce a kneaded product, and then, the kneaded product is formed into a sheet-shaped molded product with a predetermined thickness by use of a roll press. Specifically, the method of forming a sheet-shaped molded product according to JP-A-2001-230158 utilizes a production apparatus that retains the kneaded product in a space formed by a pair of rolls and a partition plate and that conducts press-molding of the kneaded product with the pair of rolls to obtain the sheet-shaped molded product. This improves the density of carbon fines, and makes it possible to achieve the high capacity.

Furthermore, in the specification of Japanese Patent No. 4840358, a method is proposed, in which an electrode composition layer including composite particles in which aggregates of an active material or conductive material having a relatively large particle diameter are covered with an active material or conductive material having a relatively small particle diameter is press-bonded to a collector to produce an electrode sheet for electrochemical elements in a state where the shapes of composite particles remain unchanged.

SUMMARY

However, in the technique described in JP-A-2001-230158, a dry powder coating material 41 is supplied to a space between a first roll 51 and a second roll 52, and the dry powder coating material 41 is formed into a film on a coating object 21, as shown in FIG. 18. Therefore, it is impossible to form a film with a wet coating material including a solvent. Furthermore, a strength of the sheet-shaped molded product will be low, and therefore, it is difficult to conduct molding with a long size and to wind the resulting product with a roll. Thus, there was a problem of poor production efficiency in the technique described in JP-A-2001-230158.

Furthermore, in the technique described in Japanese Patent No. 4840358, composite particles 42 that are a dry coating material are supplied to a space between a first roll 51 and a second roll 52, and the dry composite particles 42 are formed into a film on a coating object 21, as shown in FIG. 19. Therefore, it is impossible to form a film with a wet coating material including a solvent. Further, the technique requires a step of preparing a powder coating material, followed by preparing composite particles 42. Consequently, there was a problem of poor production efficiency. In addition, it is required that a large amount of a binder be included in order to prevent collapse of the composite particles. Therefore, there was a problem of inferior product performance in sheet-shaped molded products that were formed by use of the technique described in Japanese Patent No. 4840358.

Instead of the dry powder coating materials of the above patent literatures, a wet coating material can be used. It is formed into a coating film by rolling the coating material between two rolls, and the coating film is transferred onto a collector to form a coating film on the collector, thereby solving the above-described problems. However, in a case of forming a coating film with a wet coating material, there was a problem that the coating material remained on surfaces of rolls, resulting in inferior transferability and inferior smoothness of the coating film, and that, consequently, a uniform coating film could not be formed.

In addition, in a case where a coating film is produced with a roll, there was a problem that coating particles in the coating film material were crushed if the surface of the roll was hard, and that the performance of the product was inferior.

In view of the above-described problems, as well as other concerns, an object is to produce a high-quality coating film with a uniform thickness without crush of coating particles even in a case where a wet coating material that does not require a step of drying the coating material is used, while maintaining high productivity.

In order to achieve the above object, the coating film production apparatus includes: one or two first rolls that roll the mixture coating material; and a second roll that is placed facing the first rolls with the mixture coating material placed therebetween, wherein at least one of the first rolls has, on its surface, a surface layer having a hardness lower than that of the coating particles, and the mixture coating material is supplied to a gap between two of the first rolls or a gap between the first rolls and the second roll, and is rolled to produce the coating film.

Furthermore, a novel coating material production method produces a coating film with one or two first rolls rolling a mixture coating material and a second roll that is placed facing the first rolls with the mixture coating material placed therebetween, the method including: supplying the mixture coating material to a gap between two of the first rolls or a gap between the first rolls and the second roll; and rolling the mixture coating material over the first rolls to the second roll to form the mixture coating material into a coating film, thereby producing the coating film, wherein a surface layer having a hardness lower than a volume of the coating particles is provided on surfaces of the first rolls.

As described above, by providing the surface layer with an optimized hardness on the surface of the roll used for supply of the mixture coating material, a high-quality coating film with a uniform thickness can be produced, even in a case where a wet coating material that does not require a step of drying the coating material is used, while maintaining high productivity.

BRIEF DESCRIPTION OF THE DRAWINGS

FIG. 16 is a diagram that shows a table of measurement results of Examples 1 and 2.

FIG. 17 is a diagram that shows a table of measurement results of Comparative Examples 1 to 8.

DESCRIPTION OF EXAMPLES

In a coating film production apparatus and a coating film production method according to various embodiments, a mixture coating material is coated onto a surface of a long coating object to produce a coating film.

Hereinafter, various exemplary embodiments will be described with reference to drawings. In addition, the same symbols are affixed to the same components, thereby omitting some explanations, as appropriate, in the following descriptions.

At first, a coating film production apparatus using two rolls and a coating film production method using the same will be described.

Figure 1:
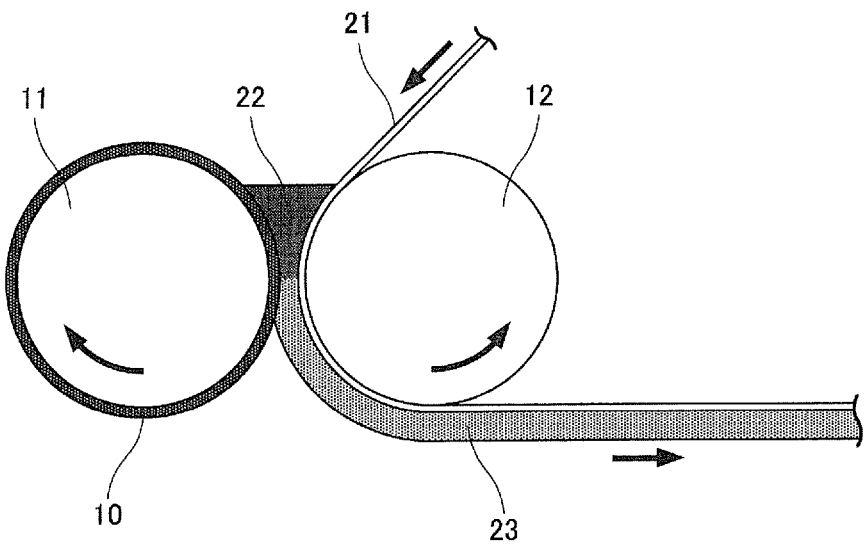
FIG. 1 is a cross-section diagram that shows a basic configuration of rolls in a coating film production apparatus according to an embodiment.

FIG. 1 is a diagram that shows a basic configuration of rolls in a coating film production apparatus according to an embodiment.

As shown in FIG. 1, the basic structure of the coating film production apparatus is a structure in which a first roll 11 and a second roll 12 are placed across a gap; a coating object 21 and a mixture coating material 22, which is a coating film material, simultaneously pass through the gap; and thus, the mixture coating material 22 is press-bonded to the coating object 21, thereby producing a coating film 23. The first roll 11 and the second roll 12 each include cylinder-shaped portions, and are placed so that their cylinder outer peripheral portions face each other. In addition, the first roll 11 and the second roll 12 each rotates along the outer peripheral surfaces, and their rotation directions are opposite to each other.

As shown in FIG. 1, in the coating film production apparatus, the mixture coating material 22 enters the gap between the first roll 11 and the second roll 12. The first roll 11 rotates in a direction opposite to the second roll 12. Additionally, the coating object 21 runs in the same direction as the rotating direction of the second roll 12 at a speed equal to a circumferential speed of the second roll 12, and passes through the gap between the first roll 11 and the second roll 12. This allows the mixture coating material 22 to be transferred in a form of a coating film onto the coating object 21. Subsequently, the coating film 23 formed by transferring the mixture coating material 22 in a form of a coating film is delivered to subsequent steps such as a pressing step, a drying step, and a stripping step.

In this coating step, with regard to materials for the first roll 11 and the second roll 12, products with a high surface hardness that will not deform due to the hardness of the mixture coating material 22 (e.g. SUS) are preferable.

In the configuration of FIG. 1, in order to transfer the mixture coating material 22 in a form of coating film from the first roll 11 onto the coating object 21, the surface of the first roll 11 is preferably covered with a material with excellent transferability. For example, the surface of the first roll 11 is preferably covered with rubber elastic materials such as urethane rubber, silicon rubber, fluororubber, chloroprene rubber, nitrile rubber and butyl rubber; resin materials, e.g., polymer materials such as a PTFE sintered product, fluororesin, silicone resin and PEEK resin; inorganic materials such as alumina, silica, titania, nickel, chromium, chromium nitride, zirconia, zinc oxide, magnesia, tungsten carbide, DLC, and diamond; metal materials; composite compound materials; fluorine compounds, or the like. Furthermore, in terms of durability or abrasion resistance, inorganic materials, metal materials or their composite compound materials, or fluorine compounds may be used. However, it is not limited to these materials as long as the material has sufficient transferability.

Further, in the configuration of FIG. 1, an appropriate material for the surface layer 10 of the first roll 11 must be selected in accordance with a hardness of the mixture coating material 22 used herein, in particular, a crush strength of coating particles included in the mixture coating material 22 or a strength required to collapse a granule that is an aggregate of the coating particles. When the surface layer 10 is excessively hard against the hardness of the coating particles, collapsed coating particles will be further crushed, and thus, the product performance will be deteriorated. Therefore, in the coating film production apparatus according to the embodiment, the surface layer 10 is provided on the surface of the first roll 11, and the hardness of the surface layer 10 is made equal to or lower than a hardness that does not cause crush the collapsed coating particles, and, for example, may be adjusted to a hardness lower than a hardness of the coating particles. In addition, when the surface layer 10 is excessively soft against the granules, the granules cannot be collapsed into particles, and, consequently, a target number of particle layers, i.e. a target film thickness cannot be obtained. Therefore, it is preferable that the hardness of the surface layer 10 be made equal or higher than a hardness that can cause collapse the granules into particles, i.e., a hardness that can break interparticle bonds in the granules to thereby collapse the granules into particles. For example, when the coating particles are made of easily-collapsed or soft materials that have been aggregated by weak bonds, such as layered substances or flake substances, a material for the surface layer 10 of the first roll 11 may be a rubber elastic material or resin material, and is allowed to have a hardness that hardly causes crush of collapsed particles. In addition, a metal material, composite compound material, fluorine compound, or the like may be coated in a thin layer onto the surface of the above-mentioned rubber elastic material or resin material. On the other hand, when the coating particles in the mixture coating material 22 are made of a hard material such as a metal, metal oxide, sintered product, ceramic or hard resin, a material for surface layer 10 of the first roll 11 is preferably formed of a hard material such as an inorganic material, inorganic/organic hybrid material, metal material, composite compound material, fluorine compound or the like, or is preferably covered with these hard materials, such that collapsed coating particles are hardly crushed, but such that the granules can be collapsed into coating particles. In addition, in order to improve durability or abrasion resistance of the surface layer 10 of the first roll 11, the strength of the material itself may be improved by known techniques within the scope of the various embodiments. Examples of such known techniques include treatments for improving strength of a material itself such as by providing functional groups thereto or by changing the crystal structure or molecular structure, etc.

Figure 5:
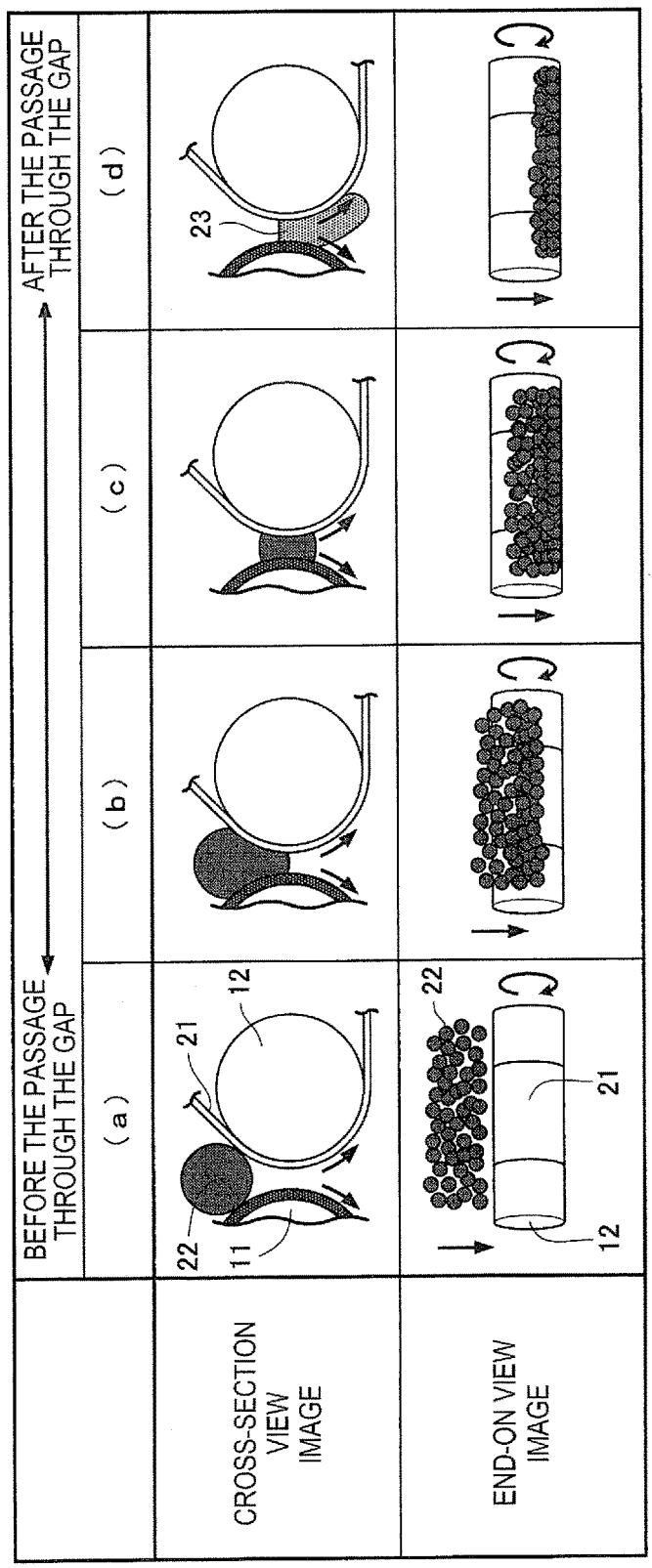
FIG. 5 is a schematic diagram that shows steps of inter-roll transfer process in a coating film production method according to an embodiment.

FIG. 5 shows a process in which the mixture coating material 22 is supplied to a gap between the second roll 12, on which the coating object 21 runs, and the first roll 11, and thus, the coating film 23 is formed. In FIG. 5, a instance in which the mixture coating material 22 passes through a gap between the first roll 11 and the second roll 12 is divided into Steps (a) to (d), whereby cross-sectional and lateral configurations are shown. Each step will be described below.

In Step (a) of FIG. 5, the mixture coating material 22 is supplied between a gap between the coating object 21 running on the second roll 12 and the first roll 11 from the direction directly above the rolls. For supply of the mixture coating material 1 22, a method that does not cause phenomena such as a bridge and a rat hole in which the coating material gets stuck between the first roll 11 and the second roll 12 (hereinafter, referred to by "between the rolls") and that can supply the coating material thereto in quantitative and flux manners is preferable. Specifically, a supplying method using a feeder such as a vibration feeder, screw feeder, rotary feeder, roll feeder, belt feeder, or apron feeder is preferable.

In Step (b) of FIG. 5, the mixture coating material 22 is delivered to the narrowest gap between the rolls based on rotations of the first roll 11 and the second roll 12. In this case, the mixture coating material 22 is rolled while being delivered to the gap, and is passed through the narrowest gap to form a coating film on the surface of the coating object 21. When the gap between the rolls that is present over the coating object 21 is made uniform over the width direction of the coating object 21, i.e., the direction vertical to the running direction of the coating object 21, a coating film 23 that is uniform over the width direction can be obtained. In addition, by varying a value for the gap between the rolls, the thickness of the coating film can arbitrarily be changed.

In Step (c) of FIG. 5, with regard to the coating film 23 formed by rolling between the rolls, the entire amount of the mixture coating material 22 is transferred onto the side of the second roll 12, and the mixture coating material 22 does not remain on the first roll 11. Therefore, even in subsequent steps after the first roll 11 and the second roll 12 rotate by one turn, the coating film 23 can be continuously formed from the newly-supplied mixture coating material 22, and thus, a uniform and continuous coating film 23 can be obtained as shown in Step (d) of FIG. 5.

Figure 6:
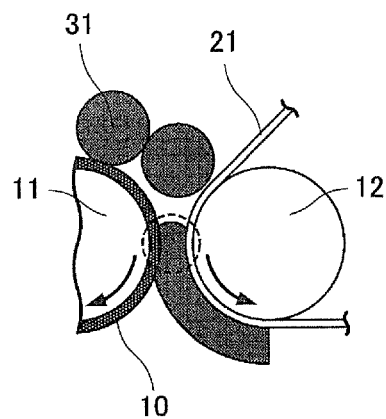
FIG. 6 is a schematic diagram that describes a state of coating particles between rolls in a coating film production apparatus according to an embodiment.
Figure 7:
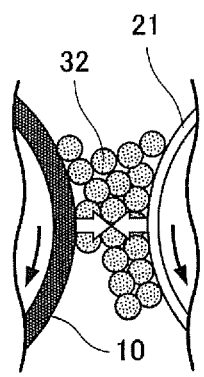
FIG. 7 is a schematic diagram that describes a state of coating particles between rolls in a coating film production apparatus according to an embodiment.
Figure 8:
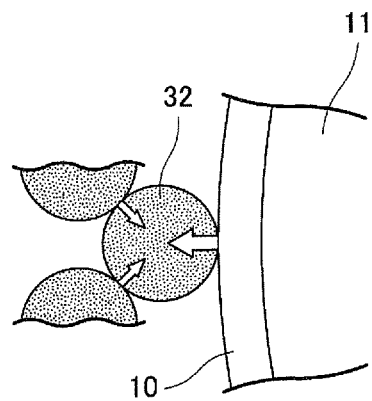
FIG. 8 is a schematic diagram that describes a state of coating particles between rolls in a coating film production apparatus according to an embodiment.

FIGS. 6 to 8 are schematic diagrams that describe states of the coating particles between the rolls in the coating film production apparatus. FIG. 6 is a diagram that shows a state of granules between the rolls, FIG. 7 is an enlarged diagram that shows a state of granules between the rolls, and FIG. 8 is an enlarged diagram that shows a state of the coating particles.

Figure 9:
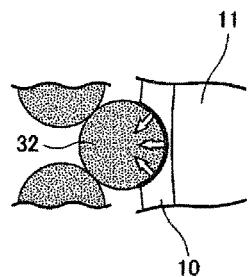
FIG. 9 is a schematic diagram that describes a distribution of a pressure applied to coating particles in a coating film production apparatus according to an embodiment.
Figure 10:
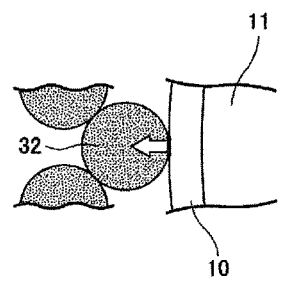
FIG. 10 is a schematic diagram that describes a distribution of a pressure applied to coating particles in a coating film production apparatus according to an embodiment.

As shown in FIGS. 6 to 8, when a granule 31 which is an aggregate of coating particles 32 included in the mixture coating material 22 receives a pressure between the first roll 11 and the second roll 12, the granule 31 is collapsed into particles, and, consequently, a coating film with a predetermined number of particle layers, i.e., with a target film thickness, can be obtained. When passing through the narrowest gap between the rolls, the pressure received by the coating particle 32 will be a maximum. When passing through the narrowest gap between the rolls, the surface layer 10 of the first roll 11, or the coating particle 32, which is in contact with the coating object 21, comes into contact with the surface layer 10 of the first roll 11 or the surface of the coating object 21 at one point, and comes into contact with a plurality of coating particles 32 adjacent to one another at the opposite side, as shown in FIG. 8. Consequently, they are subjected to distributed forces. If the surface layer 10 of the first roll 11 is made of a soft material against coating particles 32, the surface layer 10 of the first roll 11 will deform, being in surface contact with the coating particle 32, and a pressure applied to the coating particle 32 can be made small, when the coating particle 32 comes into contact with the surface layer 10 of the first roll 11 or with the coating object 21 at one point, as shown in FIG. 9. On the other hand, as shown in FIG. 10, if the surface 10 of the first roll 11 is made of a hard material against coating particles 32, the surface layer 10 of the first roll 11 will not deform, being in point contact with the coating particle 32, a pressure applied to the coating particle 32 will be larger, and thus, the coating particle 32 will easily be crushed. However, when the hardness of the surface layer 10 of the first roll 11 is lower than a pressure that causes collapse of the granules into particles, the surface layer 10 of the first roll 11 will deform before collapse of the granules. Therefore, in that case, the granules cannot be collapsed into particles. As consequence, the thickness of the coating film will be larger by a rate of deformation of the surface layer 10 of first roll 11, and thus, a problem will occur in which a coating film with a predetermined number of particle layers, i.e., with a target film thickness, cannot be obtained.

By collapsing granules that are aggregates of coating particles, a predetermined target film thickness can be obtained, and, in order to suppress crush of coating particles 32 based on penetration of coating particles 32 into the surface layer 10 of the first roll 11, an optimal relation between a crush pressure of coating particles 32, a Young's modulus of the surface layer 10 of the first roll 11 and a collapse pressure of granules can be calculated based on a simulation. The relation is expressed in the following relational expression where units are standardized to [Pa] or the like: the crush pressure of the coating particle×20> the Young's modulus of the surface layer 10 of the first roll 11> the collapse pressure of the granules. The crush pressure of coating particles and the collapse pressure of granules can be calculated out by using a general powder compression testing machine. By satisfying the relational expression, granules that are aggregates of coating particles 32 can be collapsed, thereby obtaining a predetermined target film thickness, and coating particles 32 can be allowed to adequately penetrate into the surface layer 10 of the first roll 11, thereby suppressing crush of coating particles.

Figure 11:
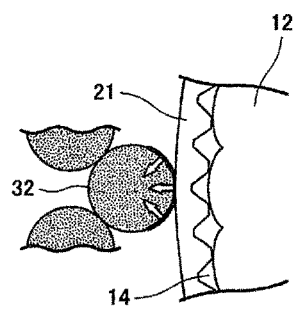
FIG. 11 is a schematic diagram that describes a void in a coating film production apparatus according to an embodiment.

While defining a hardness of the surface layer 10, or instead of defining the hardness of the surface layer 10, it is possible to mitigate the impact caused by contact of coating particles 32 with the coating object 21. However, as shown in FIG. 11, the coating object 21 is determined according to a product, and therefore, it is difficult to select a soft material for the coating object 21 against the coating particles 32. Hence, by roughening the back surface of the coating object 21 and by roughening the surface of the second roll 12 on which the coating object 21 runs, a void 14 is formed between the coating object 21 and the surface of the second roll 12, as shown in FIG. 11, and a pressure applied to coating particles 32 is distributed due to the air within the void 14, thereby also suppressing crush of coating particles 32. Since tension is applied to the coating object 21 in its moving direction, the void 14 will not be disrupted, and can exist therein, even when receiving a pressure from coating particles 32. In addition, a size of the void 14 becomes minimum when passing through the smallest gap between the rolls. Further, the size of the void 14 is made smaller than a volume of coating particles 32. This allows the mixture coating material 22 to penetrate into the coating object 21, and can suppress leakage of the air inside the void 14. Consequently, crush of coating particles 32 that are in contact with the coating object 21 can be suppressed.

Furthermore, in this configuration, a gap between the first roll 11 and the second roll 12 can arbitrarily be set in order to adjust a supply amount of the mixture coating material 22 to a predetermined weigh of an electrode plate mixture material (g/m$^2$). Alternatively, a ratio of circumferential speeds of the first roll 11 and the second roll 12 can arbitrarily be set.

In this case, a circumferential speed ratio of the second roll 12 to the first roll 11 (the circumferential speed of the second roll 12/the circumferential speed of the first roll 11) is preferably lager than 1 in order to obtain sufficient transferability.

Figure 3:
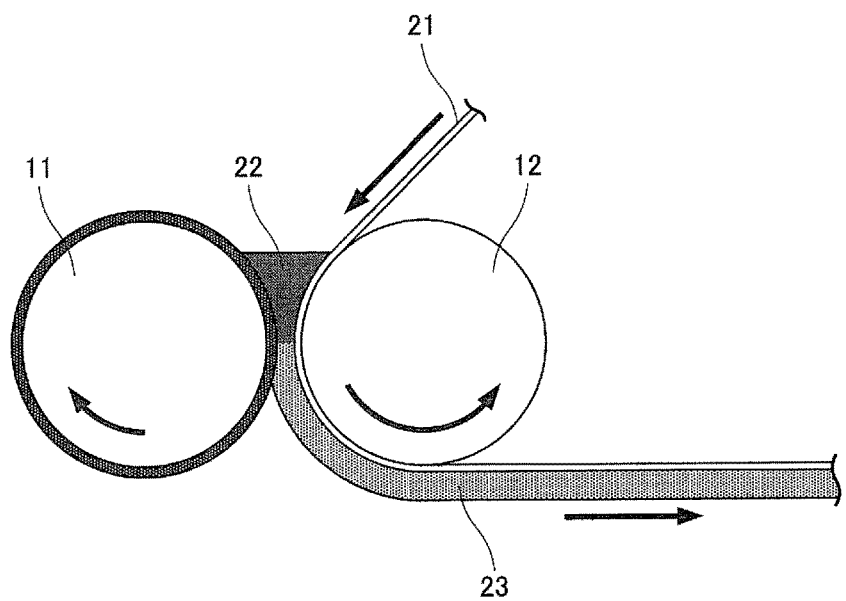
FIG. 3 is a diagram that illustrates a configuration of a coating film production apparatus according to an embodiment in which circumferential speeds of rolls differ from each other.

FIG. 3 shows a configuration diagram of rolls in a case where circumferential speeds of the first roll 11 and the second roll 12 differ from each other. As to a difference between configurations of the rolls of FIG. 1 and FIG. 3, while the speeds of the first roll 11 and the second roll 12 are equal to each other in FIG. 1, the circumferential speeds of the first roll 11 and the second roll 12 differ from each other in FIG. 3.

In FIG. 3, the second roll 12 that rotates at a circumferential speed different from that of the first roll 11 is placed. If the circumferential speed ratio (the circumferential speed of the second roll 12/the circumferential speed of the first roll 11) is smaller than 1, it is highly possible that a supply amount of the mixture coating material 22 will be deficient, and it is difficult to transfer the mixture coating material 22 from the first roll 11 onto the coating object 21, in a form of a coating film.

In addition, in a state where the mixture coating material 22 is transferred in a form of a coating film from the first roll 11 onto the coating object 21, the circumferential speed ratio may be considerably large. However, in order to generate a uniform film thickness, the circumferential speed ratio is desirably 30 or less, i.e., within a range of more than 1 to 30. When the circumferential speed ratio is larger than 1, the rate of transfer will be higher. However, this is because, if the circumferential speed ratio is larger than 30, slippage will be caused between the mixture coating material 22 and the roll, and, consequently, the rate of transfer will be inferior.

Figure 2:
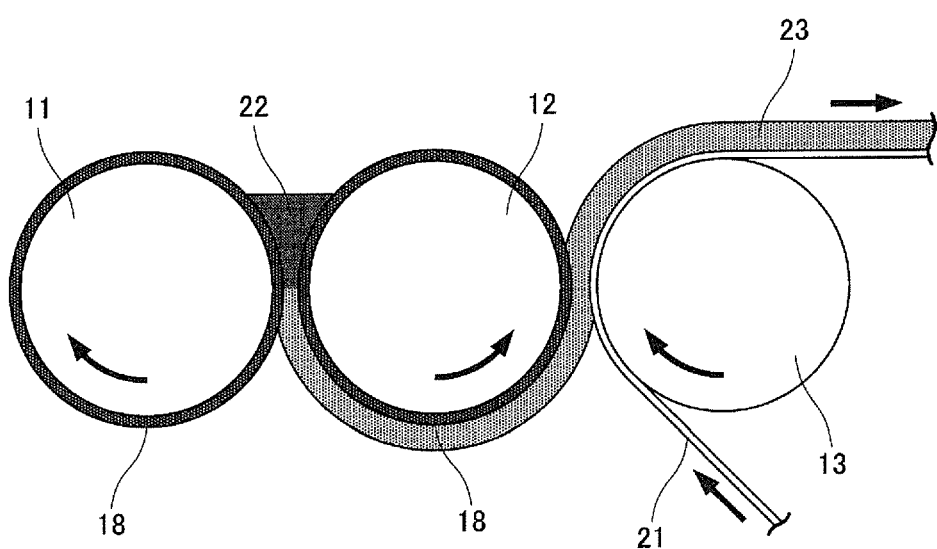
FIG. 2 is a cross-section diagram that shows a basic configuration of rolls in a coating film production apparatus with three rolls according to an embodiment.
Figure 4:
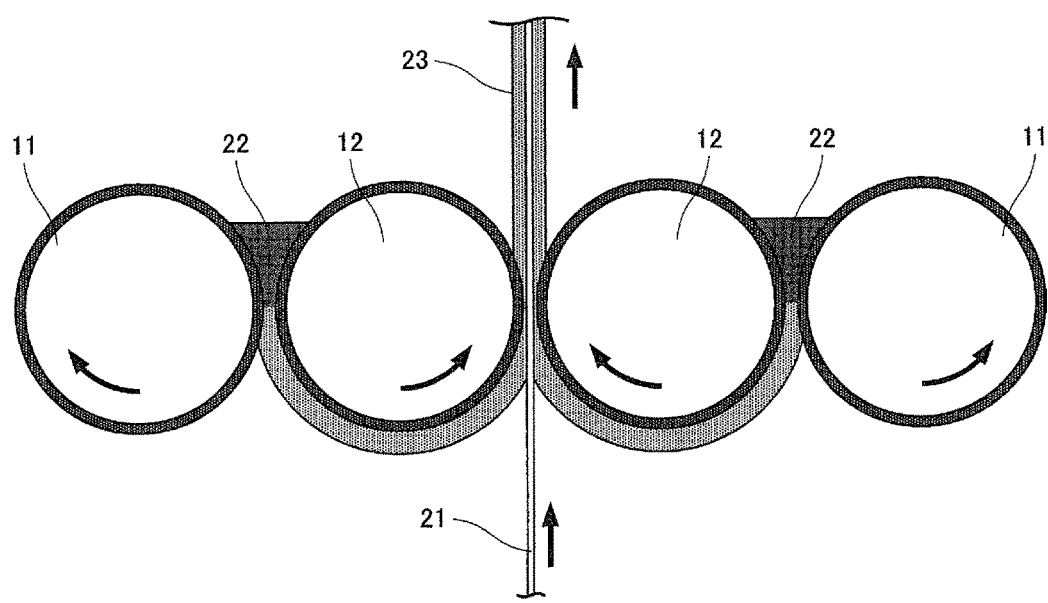
FIG. 4 is a diagram that illustrates a configuration of rolls that coat both sides of a coating object in a coating film production apparatus according to an embodiment.

FIG. 4 shows a configuration in which the both sides can be coated by combining two pairs of first rolls 11 and second rolls 12 of FIG. 2. Also, by combining two or more pairs of first rolls 11 and second rolls 12 of FIG. 2, a plurality of layers may sequentially or simultaneously be coated. In addition, the both sides are coated in FIG. 4. In FIG. 4, two pairs of first rolls 11 and second rolls 12 are placed so that the second rolls 12 are adjacent to each other. Then, the coating object 21 is allowed to run between two of the second rolls 12 that are adjacent to each other. The mixture coating material 22 is supplied from respective gaps between first rolls 11 and second rolls 12, the mixture coating materials 22 that are each transferred onto the second rolls 12 are transferred onto both sides of the coating object 21 between two of the second rolls 12 that are adjacent to each other.

Next, a coating film production apparatus using three or more rolls, and a coating film production method using the same will be described. As contrasted to the coating film production apparatus using two rolls, a coating film production apparatus described below features use of three or more rolls. One of the three or more rolls is a roll for a coating object that allows the coating object to run along its outer peripheral surface, and the rest of rolls are coating material-supplying rolls that supply and roll the mixture coating material. Further, an auxiliary roll that retains the coating object or the coating film can also be provided therein. In addition, an example of a configuration using three rolls will be explained in the following description.

In a case where mixture coating materials having high sticking force to the first roll 11 and the second roll 12, and weak binding force among the mixture coating materials, and thus exhibiting inferior transferability are used in FIG. 1, it is difficult to form the mixture coating materials 22 into a coating film when the coating film is transferred from the first roll 11 onto the coating object 21, or from the first roll 11 onto the second roll 12. This is due to problems such as difficulty in the transfer of the coating film resulting from adhesion of the coating film to the first roll 11 or the second roll 12 owing to its higher sticking force to the first rolls 11 or the second roll 12, or segmentation of the coating film owing to its weak binding force.

Therefore, three rolls are used. The configuration using three rolls will be described below.

In FIG. 2, a diagram of roll configuration of a mode where a coating film that have been formed on a surface of a roll is transferred onto a coating object 23. One point that differs from FIG. 1 is addition of a third roll 13. This is a method in which the coating film is formed between the first roll 11 that is a roll for supplying the coating material and the second roll 12, and then, the coating film 23 is formed on a material 21 to be coated running on the surface of the third roll 13 that is a roll for the coating object.

FIG. 2 shows a state where the mixture coating material 22 that has entered a space between the first roll 11 and the second roll 12 is adhered to the surface of the second roll 12, in a form of a coating film, and then, the mixture coating material 22 in a form of a coating film is transferred from the second roll 12 onto the coating object 21 running on the third roll 13.

In this case, the third roll 13 rotates in the direction opposite to that of the second roll 12, and the coating object 21 runs between the second roll 12 and the third roll 13 in the same direction as the rotating direction of the third roll 13 at a speed equal to the circumferential speed of the third roll 13.

In the configuration shown in FIG. 2, the circumferential speeds of the first roll 11 and the second roll 12 that are adjacent to each other may be made different. In addition, in the configuration shown in FIG. 2, the circumferential speeds of the second roll 12 and the third roll 13 that are adjacent to each other may be made different, as described below.

In addition, yet another roll may exist between the second roll 12 and the third roll 13, as needed.

In the configuration of FIG. 2, in order to transfer the mixture coating material 22 in a form of a coating film from the first roll 11 onto the surface of the second roll 12, or in order to transfer the mixture coating material 22 in a form of a coating film from the second roll 12 onto the coating object 21, surfaces of the first roll 11 and the second roll 12 are preferably covered with a material with excellent transferability, in the same manner as the first roll 11 of FIG. 11. The material is the same as in the description section of FIG. 1.

In the same manner as the first roll 11 of FIG. 1, also in the coating film production apparatus with three rolls of FIG. 2, a surface layer 18 is distinctively provided on the first roll 11 and the second roll 12. In addition, in the same manner as the surface layer 10 of FIG. 1, an appropriate material for the surface layer 18 must be selected in accordance with the hardness of the mixture coating material 22 used herein, in particular, a crush strength of coating particles or a strength required to collapse granules that are aggregates of coating particles. If the surface layer 18 is excessively hard against the hardness of the coating particles, coating particles will be crushed, and, consequently, the product performance will be deteriorated. On the other hand, if the surface layer 18 is excessively soft against granules, the granules cannot be collapsed into coating particles, and there will be a problem that a target number of particle layers, i.e., a target film thickness, cannot be obtained. Therefore, when the coating particles are made of a easily-collapsed material or soft material that has been aggregated by weak bonds, such as a layered substance or flake substance, a material for the surface layer 18 may be a rubber elastic material or resin material, and is allowed to have a hardness that hardly causes crush of collapsed coating particles. In addition, a metal material, composite compound material, fluorine compound, or the like may be coated in a thin layer onto the surface of the above-mentioned rubber elastic material or resin material. On the other hand, when the coating particles in the mixture coating material 22 are made of a hard material such as a metal, metal oxide, sintered product, ceramic or hard resin, a material for the surface layer 18 is preferably covered with an inorganic material, inorganic/organic hybrid material, metal material, composite compound material, or fluorine compound, or the like. In addition, in order to improve durability or abrasion resistance of the surface layer 18, the strength of the material itself may be improved by known techniques within the scope of the various embodiment ts. Examples of such known techniques include treatments for improving strength of a material itself such as by providing functional groups thereto or by changing the crystal structure or molecular structure, etc.

Figure 12:
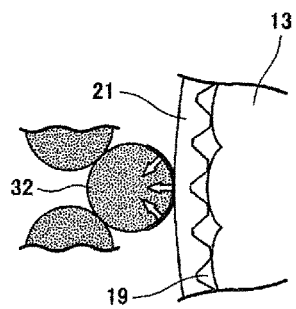
FIG. 12 is a schematic diagram that describes a void in a coating film production apparatus according to an embodiment.

In the same manner as the above descriptions with respect to FIGS. 6 to 10, by satisfying the relation expression: the crush pressure of the coating particle×20> the Young's modulus of the surface layer 18 of the roll> the collapse pressure of the granule also in the configuration of FIG. 2, granules that are aggregates of coating particles 32 can be collapsed, thereby obtaining a predetermined target film thickness, and crush of coating particles 32 can be suppressed based on penetration of coating particles 32 into the surface layer 18. In addition, in the same manner as the description as to FIG. 11, by forming a void 19 with a volume smaller than the volume of the particle between the coating object 21 and the surface of the third roll 13, as shown in FIG. 12, crush of coating particles 32 that are in contact with the coating object 21 can be suppressed.

In addition, the mixture coating material 22 supplied to the space between the first roll 11 and the second roll 12 corresponds to one example of a coating film material, and the coating film 23 that is produced by transfer of the mixture coating material 22 onto the coating object 21 in a form of a coating film corresponds to one example of a coating film. The coating film 23 in a state immediately after the mixture coating material 22 is transferred onto the coating object 21 to a state after subsequent steps such as the pressing step, the drying step and the stripping step are completed corresponds to one example of a coating film.

In the first and second embodiments, a volume water content of the mixture coating material 22 supplied to the gap between the first roll 11 and the second roll 12 is desirably 20 vol % to 62 vol %.

When the volume water content is within this range, the mixture coating material 22 does not have fluidity because a solvent exists only on surfaces of particles in the mixture coating material 22 or in the vicinity of them. When the volume water content is larger than 62 vol %, the mixture coating material 22 is likely to have fluidity. Therefore, in that case, the mixture coating material 22 adheres to both sides of the first roll 11 and the coating object 21, and it becomes difficult to form the mixture coating material 22 into a coating film. Additionally, when the volume water content is smaller than 20 vol %, most of spaces between particles in the mixture coating material 22 are not covered with a solvent. Therefore, in that case, the mixture coating material 22 cannot be formed into a coating film, and cannot be transferred onto the side of the coating object 21 in a form of a coating film.

Thus, by adjusting the volume water content of the mixture coating material 22 to a range of 20 vol % to 62 vol %, a coating film of the mixture coating material 22 can precisely be transferred onto the coating object 21.

Figure 13:
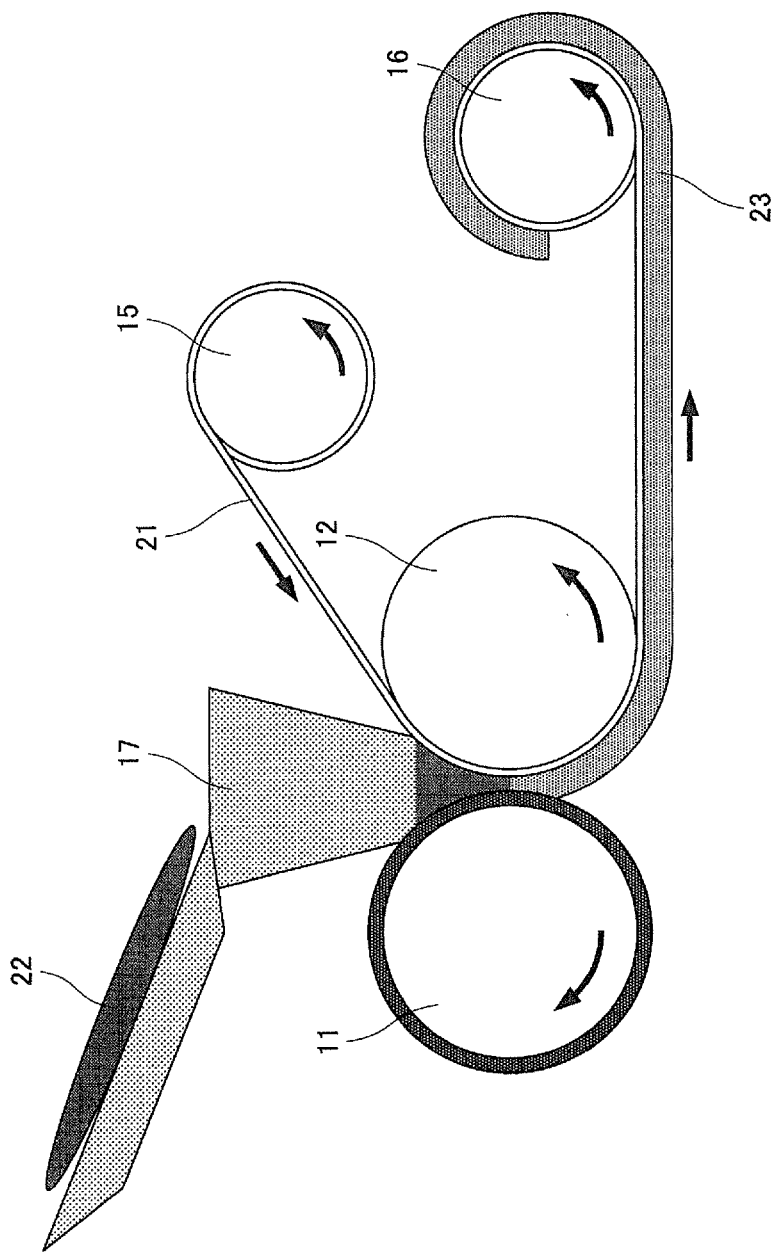
FIG. 13 is a schematic diagram that shows a configuration example of a coating film production apparatus according to an embodiment.

FIG. 13 shows a schematic diagram of a coating film production apparatus according to an embodiment. The mixture coating material 22 is supplied to a gap between the first roll 11 and the second roll 12 through a coating material-supplying hopper 17 that is placed above the gap between the first roll 11 and the second roll 12. The coating object 21 is delivered from the feeder 15, and runs on the upper surface of the second roll 12, and the mixture coating material 22 is transferred in a form of a coating film onto the coating object 21 between the first roll 11 and the second roll 12. The coating film 23 produced by transfer of the mixture coating material 22 in a form of a coating film is wound on a winder 16. The coating film 23 may be subjected to a subsequent step such as a pressing step, drying step, striping step or slitting step, before it is delivered to the winder 16, as needed. In addition, without carrying out such winding, a subsequent step such as a lamination step or assembly step may directly be conducted.

Figure 14:
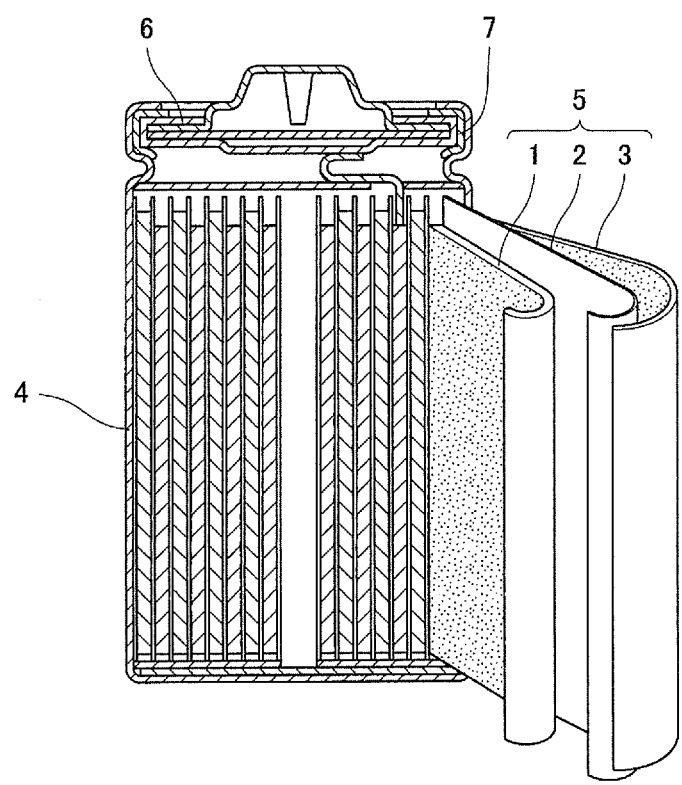
FIG. 14 is a schematic diagram that shows a longitudinal section of a lithium rechargeable battery produced according to an embodiment.

FIG. 14 shows a schematic longitudinal section diagram of a lithium rechargeable battery using anode plates and cathode plates that are coating films produced by the coating film production apparatus and the production method according to an embodiment. With regard to assembly of a cylindrical lithium rechargeable battery, as shown in FIG. 14, a cathode plate 1 using a composite lithium oxide as an active material and an anode plate 2 using a lithium-retaining material as an active material are coiled in a spiral form through a separator 3, such a spiral form of an electrode group 5 is then installed inside a cylindrical battery case 4 with a bottom, a predetermined quantity of an electrolytic solution including a non-aqueous solvent is then poured into the battery case 4, a sealing plate 6 with a gasket 7 attached to its rim is inserted into an opening portion of the battery case 4, and the opening portion of the battery case 4 is folded to the inward direction, thereby sealing the battery case 4.

Figure 15:
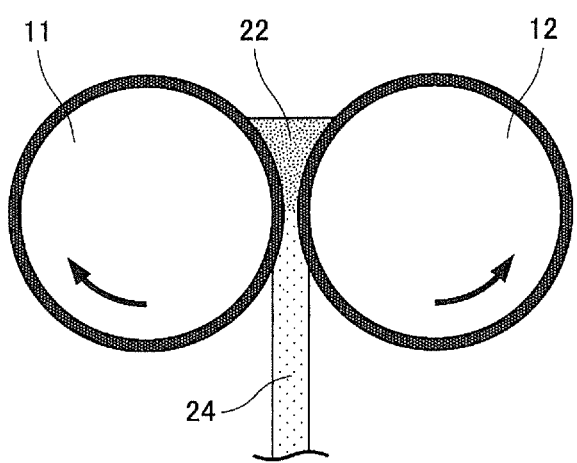
FIG. 15 is a schematic diagram that shows a step of preparing a sheet-shaped coating film in a coating film production method according to an embodiment.
Figure 18:
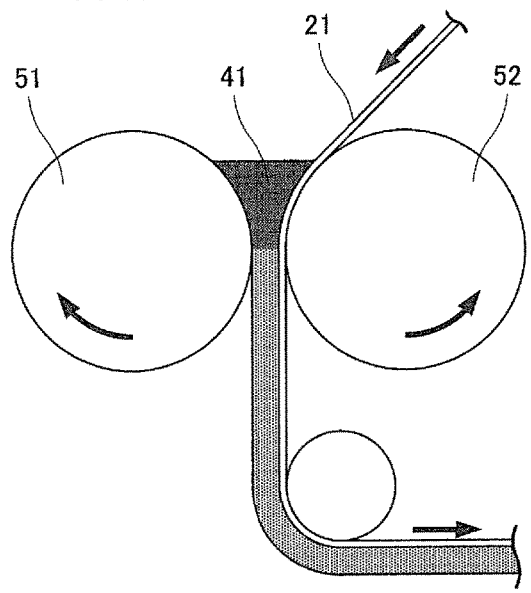
FIG. 18 is a diagram that shows a configuration of a roll-pressing apparatus in JP-A-2001-230158.
Figure 19:
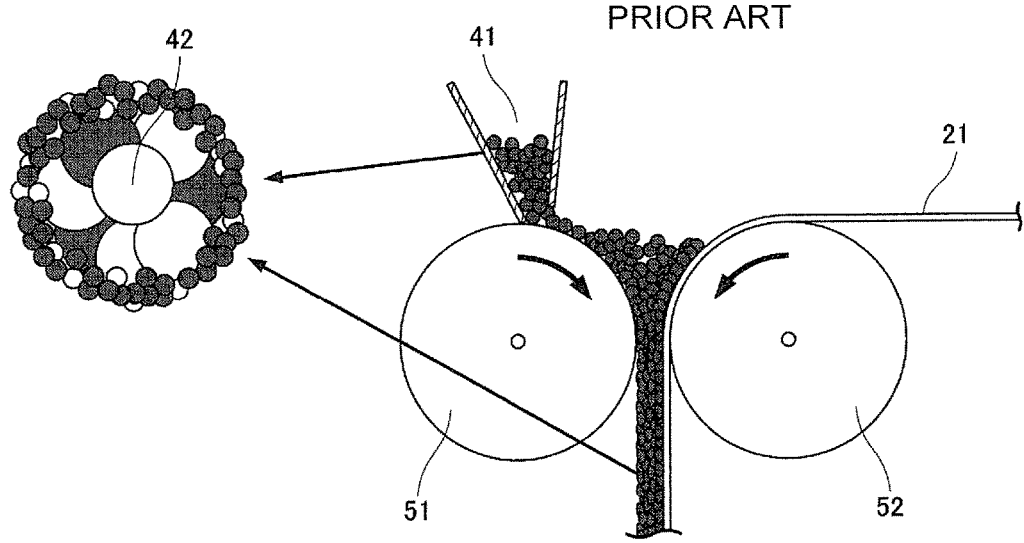
FIG. 19 is a diagram that shows a configuration of an apparatus for producing an electrode composition layer with a support in Japanese Patent No. 4840358.

In addition, as shown in FIG. 15, even when a coating object is not present, by allowing the mixture coating material 22 to pass through the space between the first roll and the second roll, the mixture coating material 22 is rolled, and a sheet-shaped coating film 24 without a coating object can be produced. That is, the coating film 24 is a product obtained by rolling the mixture coating material 22 in a form of sheet without using a coating object 21. For example, when particles such as of an ion-exchange resin, carbon, magnetic material, glass, or ceramic are used as particles for such a sheet-shaped coating film 24, a sheet-shaped coating film that is used for purposes such as a filter member sheet, electrode sheet, capacitor electrode sheet, power storage device electrode sheet, magnetic sheet, electromagnetic wave absorption sheet, heat insulation sheet and heat radiation sheet can be produced.

EXAMPLES

Results of experiments that were conducted by the present inventors will be described as examples and comparative examples by using FIGS. 1 and 2.

Example 1

In an experiment of Example 1, an anode plate was prepared as a coating film, and was examined.

At first, a coating material A for an anode mixture was prepared.

An anode active material, a binder, and a thickener were stirred together with a predetermined amount of water in a dual-arm kneading machine, thereby preparing a coating material A for an anode mixture having a volume water content of 50%. In this case, 100 parts by volume of artificial graphite were used for the anode active material. Moreover, 2.3 parts by volume of a styrene/butadiene copolymer rubber particle dispersion were used for the binder relative to 100 parts by volume of the active material in terms of a solid content of the binder. Furthermore, 1.4 parts by volume of carboxymethyl cellulose were used for the thickener relative to 100 parts by volume of the active material. A collapse pressure of granules of the coating material A for the anode mixture and a crush pressure of artificial graphite particles were measured with a microcompression testing machine (MCT-W500 manufactured by Shimadzu Corporation), and were 0.02 GPa and 0.3 GPa, respectively.

A configuration of rolls used for preparation of an anode plate onto which the mixture coating material A was coated was as follows.

As shown in FIG. 2, a first roll 11 and a second roll 12, as well as the second roll 12 and a third roll 13 were placed parallel to each other where a gap of 100 μm is present at the most narrowest location. Materials of the first roll 11, the second roll 12 and the third roll 13 were SUS, and their surfaces were subjected to a hard chromium plating treatment. In addition, both of the first roll 11 and the second roll 12 were covered with a fluororesin film as a surface layer 18.

A copper foil with a thickness of 15 μm was used as a coating object 21 that was passed through the space between the second roll 12 and the third roll 13, and the copper foil was allowed to move at the same speed as the circumferential speed of the third roll 13. Circumferential speeds of the second roll 12 and the third roll 13 were set to 30 m/min and 45 m/min, respectively, and a circumferential speed of the first roll 11 was set to 6 m/min so that the circumferential speed ratio (the circumferential speed of the second roll 12/the circumferential speed of the first roll 11) was 5.

The back surface of the copper foil was made as a rough surface, such that a void with a volume equal to or smaller than the fine artificial graphite particle was present between the third roll 13 and the copper foil when the mixture coating material A that corresponded to the mixture coating material 22 passed through a domain where the gap between the second roll 12 and the third roll 13 was the most narrowest.

Then, the prepared mixture coating material A for an anode was supplied to the space between the first roll 11 and the second roll 12, and a coating film was formed on the second roll 12. Subsequently, the coating film of the mixture coating material A was transferred from the second roll 12 onto the copper foil, the solvent was then volatilized in a drying step, and the coating film was subjected to compression molding in a pressing step, thereby preparing an anode plate.

Example 2

In an experiment of Example 2, a cathode plate was prepared as a coating film, and was examined.

At first, a coating material B for a cathode mixture was prepared.

A cathode active material, a binder, and a conductive material were stirred together with a predetermined amount of NMP in a dual-arm kneading machine, thereby preparing a mixture coating material for a cathode having a volume water content of 45%. 100 parts by volume of a nickel-based cathode material were used for the cathode active material. Moreover, 2.0 parts by volume of PVDF were used for the binder relative to 100 parts by volume of the active material in terms of a solid content of the binder. Furthermore, 3.0 parts by volume of acetylene black were used for the conductive material relative to 100 parts by volume of the active material. A collapse pressure of granules of the coating material B for the cathode mixture and a crush pressure of nickel-based cathode material particles were measured with a microcompression testing machine (MCT-W500 manufactured by Shimadzu Corporation), and were 0.02 GPa and 50 GPa, respectively.

A configuration of rolls used for preparation of a cathode plate onto which the mixture coating material B was coated was as follows.

As shown in FIG. 2, a first roll 11 and a second roll 12, as well as the second roll 12 and a third roll 13 were placed parallel to each other such that a gap of 100 µm was present therebetween, in the same manner as Example 1. Materials of the first roll 11, the second roll 12 and the third roll 13 were SUS, and their surfaces were subjected to a hard chromium plating treatment. In addition, both of the first roll 11 and the second roll 12 were covered with a DLC film as a surface layer 18.

An aluminum foil with a thickness of 15 µm was used as a coating object 21 that was passed through the space between the second roll 12 and the third roll 13, and the aluminum foil was allowed to move at the same speed as the circumferential speed of the third roll 13. Circumferential speeds of the second roll 12 and the third roll 13 were set to 30 m/min and 45 m/min, respectively, and a circumferential speed of the first roll 11 was set to 6 m/min so that the circumferential speed ratio (the circumferential speed of the second roll 12/the circumferential speed of the first roll 11) was 5.

The back surface of the above aluminum foil was made as a rough surface, such that a void with a volume equal to or smaller than the fine artificial graphite particle was present between the third roll 13 and the aluminum foil when the mixture coating material B that corresponded to the mixture coating material 22 passed through a domain where the gap between the second roll 12 and the third roll 13 was the most narrowest.

Then, the prepared mixture coating material B for a cathode was supplied to the space between the first roll 11 and the second roll 12, and a coating film was formed on the second roll 12. Subsequently, the coating film of the mixture coating material B was transferred from the second roll 12 onto the aluminum foil, the solvent was then volatilized in a drying step, and the coating film was subjected to compression molding in a pressing step, thereby preparing a cathode plate.

Comparative examples and comparison results will be explained below using FIGS. 1 and 2.

With regard to the following comparative examples, in Comparative Examples 1, 2 and 5 to 8, only a method for preparing an anode plate was different from that of Example 1. In Comparative Examples 3 and 4, only a method for preparing a cathode plate was different from Example 2.

Evaluations on anode plates and cathode plates were carried out in terms of coating film transferability, crush properties of particles, and a reduction of a film thickness that relates to whether or not granules could be collapsed to produce a predetermined target film thickness, and the following techniques were used therefor.

With regard to the evaluation on coating film transferability, a measurement was carried out to determine whether a mixture coating material 22 was transferred from the first roll 11 onto the coating object 21 running on the third roll 13 through the second roll 12 in a form of a coating film. Specifically, by comparing a weight of the charged mixture coating material 22 with a weight of the transferred coating film, a transfer rate can be measured. In this case, when the transfer rate was 90% or higher, the transferability was considered as superior. When the transfer rate was lower than 90%, the transferability was considered as inferior.

As to crush properties of particles, a surface observation was carried out with a microscope to determine whether active material particles were crushed during preparation of an electrode plate.

As to the reduction of film thickness, whether a thickness of a coating film was equal to the length of the adjusted gap between rolls was determined.

Comparative Example 1

In Comparative Example 1, an anode plate was prepared in the same manner as Example 1 except that DLC was used for a surface layer 18 of the first roll 11 and the second roll 12.

Comparative Example 2

In Comparative Example 2, an anode plate was prepared in the same manner as Example 1 except that silicon rubber was used for a surface layer 18 of the first roll 11 and the second roll 12.

Comparative Example 3

In Comparative Example 3, a cathode plate was prepared in the same manner as Example 2 except that a fluororesin was used for a surface layer 18 of the first roll 11 and the second roll 12.

Comparative Example 4

In Comparative Example 4, a cathode plate was prepared in the same manner as Example 2 except that silicon rubber was used for a surface layer 18 of the first roll 11 and the second roll 12.

Comparative Example 5

In Comparative Example 5, an anode plate was prepared in the same manner as Example 1 except that the back surface of the copper foil was made as a mirror surface and that a number of voids between the copper foil and the third roll was made smaller compared with the case where the back surface of the copper foil was made as a rough surface.

Comparative Example 6

In Comparative Example 6, an anode plate was prepared in the same manner as Example 1 except that the volume water content of the mixture coating material 22 for an anode was 15%.

Comparative Example 7

In Comparative Example 7, an anode plate was prepared in the same manner as Example 1 except that the volume water content of the mixture coating material 22 for an anode was 70%.

Comparative Example 8

In Comparative Example 8, an anode plate was prepared in the same manner as Example 1 except that an acrylic resin was used for a material for a surface layer 18 of the first roll 11 and the second roll 12.

Measurement results of each of Examples 1 and 2 are shown in FIG. 16, and measurement results of each of Comparative Examples 1 to 8 are shown in FIG. 17.

As apparent from FIG. 16, in Examples 1 and 2, by selecting materials for the surface layers 18 of the respective rolls such that the crush pressure of the coating particles included in the mixture coating material 22×20> the Young's modulus of the surface layer 18 of the roll> the collapse pressure of the granules, penetration depths of coating particles into the surface layers were 50% or higher and 5% or lower of the respective particle diameters. In other words, results indicating that, when a penetration depth of coating particles into the surface layer in rolling the mixture coating material was 5% to 50% of a diameter of the coating particles, the coating particles were not crushed, and granules were collapsed to produce a target thickness were obtained. Moreover, results indicating that, by making the back surface of the coating object 21 as a rough surface to provide voids between the back surface and the roll, coating particles that came into contact with the coating object 21 were not crushed were obtained. Furthermore, by selecting a material for the surface layer 18 such that the water contact angle of the surface layer 18 was 90° or higher, superior transferability could be obtained. In this case, the water contact angle refers to an angle formed by a tangent line of a surface of water droplet and the plate in a boundary between the surface of water droplet and the surface of the plate when the water droplet was dropped onto the surface of the material of the plate-shaped surface layer 18.

As shown in FIG. 17, in Comparative Example 1 where a surface layer 18 of the rolls that did not satisfy: a crush pressure of the coating particles×20> a Young's modulus of the surface layer 18 of the roll was selected, a penetration depth of the coating particles into the surface layer was 3% of the particle diameter, and this resulted in crush of the coating particles. This was because the surface layer 18 was excessively hard against the coating particles.

In Comparative Examples 2 to 4 where a surface layer 18 of the roll that did not satisfy: a Young's modulus of the surface layer 18 of the roll> a collapse pressure of the granules was selected, penetration depths of coating particles into the surface layers were 55% or more of particle diameters, and coating particles were not crushed. However, it was difficult to collapse granules, and, consequently, a reduction of the film thickness could not be achieved. This was because the granules excessively penetrated into the surface layer 18.

In Comparative Example 5 where the back surface of the copper foil was made as a mirror surface and voids between the copper foil and the third roll 13 were minimized, a pressure applied to coating particles that came into contact with the copper foil was not distributed, and this resulted in crush of coating particles. Therefore, it can be understood that the back surface of the coating object 21 is preferably made as a rough surface, thereby providing voids between the coating object 21 and the roll.

In Comparative Examples 6 and 7 where volume water contents of the coating film materials were outside the range of 20 vol % to 62 vol %, the transferability from the second roll 12 onto the coating object 21 was inferior, and results in which most of coating film materials remained on the second roll were obtained. Therefore, it can be understood that a volume water content of a coating film material is preferably adjusted to 20 vol % to 62 vol %.

In Comparative Example 5 where a circumferential speed ratio of the second roll 12 to the first roll 11 (the circumferential speed of the second roll 12/the circumferential speed of the first roll 11) was a value smaller than 1, the transferability from the second roll 12 onto the coating object 21 was slightly inferior, and results in which coating film material remained on the second roll were obtained. Therefore, it can be understood that the circumferential speed ratio (the circumferential speed of the second roll 12/the circumferential speed of the first roll 11) is preferably set to 1 or higher.

In Comparative Example 8 where an acrylic resin was selected as a material for the surface layer 18 of the first roll 11 and the second roll 12, the transferability from the second roll 12 onto the coating object 21 was inferior, and results in which most of coating material remained on the second roll were obtained.

Based on the above-described evaluations, when materials for the surface layer 18 of the first roll 11 and the second roll 12 are each selected such that the crush pressure of the particle×20> the Young's modulus of the surface layer of the roll> the collapse pressure of the granule; and such that a penetration depth of coating particles into the surface layer is equal to 5% to 50% of a particle diameter, the coating particles moderately penetrate into the surface layer 18 of the roll, and the surface layer 18 of the rolls deforms. Therefore, superior transferability can be obtained, particles are not crushed, and granules are collapsed to obtain a target thickness. Moreover, the back surface of the coating object 21 is preferably made as a rough surface, thereby providing voids between the back surface and the roll. Furthermore, a material for the surface layer 18 of the roll with a water contact angle of 90° or higher is preferably selected. Additionally, a volume water content of the mixture coating material 22 is preferably within a range of 20 vol % to 62 vol %. It was revealed that, in such a manner, a production apparatus that can realize production of a uniform coating film without crush of an active material, and a production method using the same can be provided, and that a rechargeable battery with excellent output properties can be provided by using an electrode plate prepared by the above-described production method. In other words, by rolling, between rolls, a coating material including a wet electrode composition to form a coating film, followed by transfer of the coating film onto a collector, an electrode composition layer can be formed directly on the collector, and this makes it possible to realize high productivity thereof, and to further realize production of a uniform coating film without crush of coating particles even when a wet coating material, which does not require a step of drying the coating material, is used.

Since a rechargeable battery using an electrode plate with small thickness variations exhibits excellent output properties, the rechargeable battery can used for electronic apparatuses (personal computers, cell phones, smartphones, digital still cameras, TVs, video cameras, and the like), electric tools (electric drills, electric screwdrivers, and the like), and transportations such as vehicles (wheelchairs, bicycles, motor scooters, motorcycles, automobiles, welfare vehicles, electric trains, steam trains, and the like). Furthermore, the rechargeable battery can also be applied to a power storage system as an emergency power source.

In addition, rolls for production of a coating film and the production method using the same can be expanded to a method of producing a resin film in capacitors, ferrite sheets or water softeners, or other functional resin films, besides the above-mentioned electrode plate for batteries.

Accordingly, a high-quality coating film with a uniform thickness can be produced even in a case where a wet coating material that does not require a step of drying the coating material is used, while maintaining high productivity. Therefore, a production apparatus can produce a coating film by transfer of a coating film material onto a coating object, a coating film production method using the same, and the like.

What is claimed is:

1. A coating film production apparatus that produces a coating film, said apparatus comprising:
a feeder supplying a mixture coating material including coating particles; and
one or two first rolls and a second roll facing the first rolls configured to provide a gap between the first rolls and the second roll and roll the mixture coating material,
wherein the feeder supplies the mixture coating material to the gap between the first rolls and the second roll, at least one of the first rolls has, on its surface, a surface layer configured to press the mixture coating material so that a penetration depth of the coating particles into the surface layer in rolling the mixture coating material is 5% to 50% of a diameter of the coating particles,
the coating particles include one of: (1) artificial graphite particles having a collapse pressure of a granule that is an aggregate of the coating particles of approximately 0.02 GPa and a crush pressure of approximately 0.3 GPa; and (2) nickel-based cathode material particles having a collapse pressure of approximately 0.02 GPa and a crush pressure of approximately 50 GPa;
a surface layer of the at least one of the first rolls includes at least one of: (1) a fluororesin film; and a (2) diamond-like carbon (DLC) film; and
a relational expression of a Young's modulus of the surface layer is: a crush pressure of the coating particles×20>the Young's modulus of the surface layer>a collapse pressure of the granule.

* * * * *